United States Patent [19]

Hawkins

[11] 4,313,357

[45] Feb. 2, 1982

[54] WORKPIECE SUPPORT AND DISCHARGE SYSTEM FOR POWER SQUARING SHEARS

[75] Inventor: Paul F. Hawkins, Greensboro, N.C.

[73] Assignee: Wysong & Miles Company, Greensboro, N.C.

[21] Appl. No.: 150,006

[22] Filed: May 15, 1980

[51] Int. Cl.³ .............................................. B26D 7/27
[52] U.S. Cl. ......................................... 83/81; 83/156; 83/157; 83/373
[58] Field of Search .................... 83/81, 156, 157, 373

[56] References Cited

U.S. PATENT DOCUMENTS

| | | | |
|---|---|---|---|
| 1,287,315 | 12/1918 | Holmes | 83/157 |
| 3,631,750 | 1/1972 | Hanni | 83/157 |
| 3,861,258 | 1/1975 | Irvine | 83/157 X |
| 4,252,041 | 2/1981 | Cros | 83/157 |

FOREIGN PATENT DOCUMENTS 2241370  3/1975  France ................................... 83/157

*Primary Examiner*—James M. Meister
*Attorney, Agent, or Firm*—Munson H. Lane; Munson H. Lane, Jr.

[57] ABSTRACT

Apparatus is provided for supporting the end portion of a workpiece blank which extends through and to the rear of power shear blades. The apparatus includes a table top and a frame supporting the table top. The front portion of the table top is supported for limited vertical displacement by rollers on opposite sides of the table engaged in horizontal track sections of vertically displaceable tracks interposed between the table top and the frame. The rear portion of the table top is separately supported by reciprocating rear table supports on opposite sides of the table top, the rear table supports being guided for vertical displacement in vertical ways provided on opposite sides of the frame. The table top is displaceable downwardly in response to downward movement of the movable shear blade, and is tiltable rearwardly after initial downward displacement by reason of the rear table supports being allowed greater downward displacement than the rollers supporting the front portion of the table top. Power actuators are provided to lift the table top to a normal raised level position substantially at the same level as the stationary blade of the shear.

18 Claims, 9 Drawing Figures

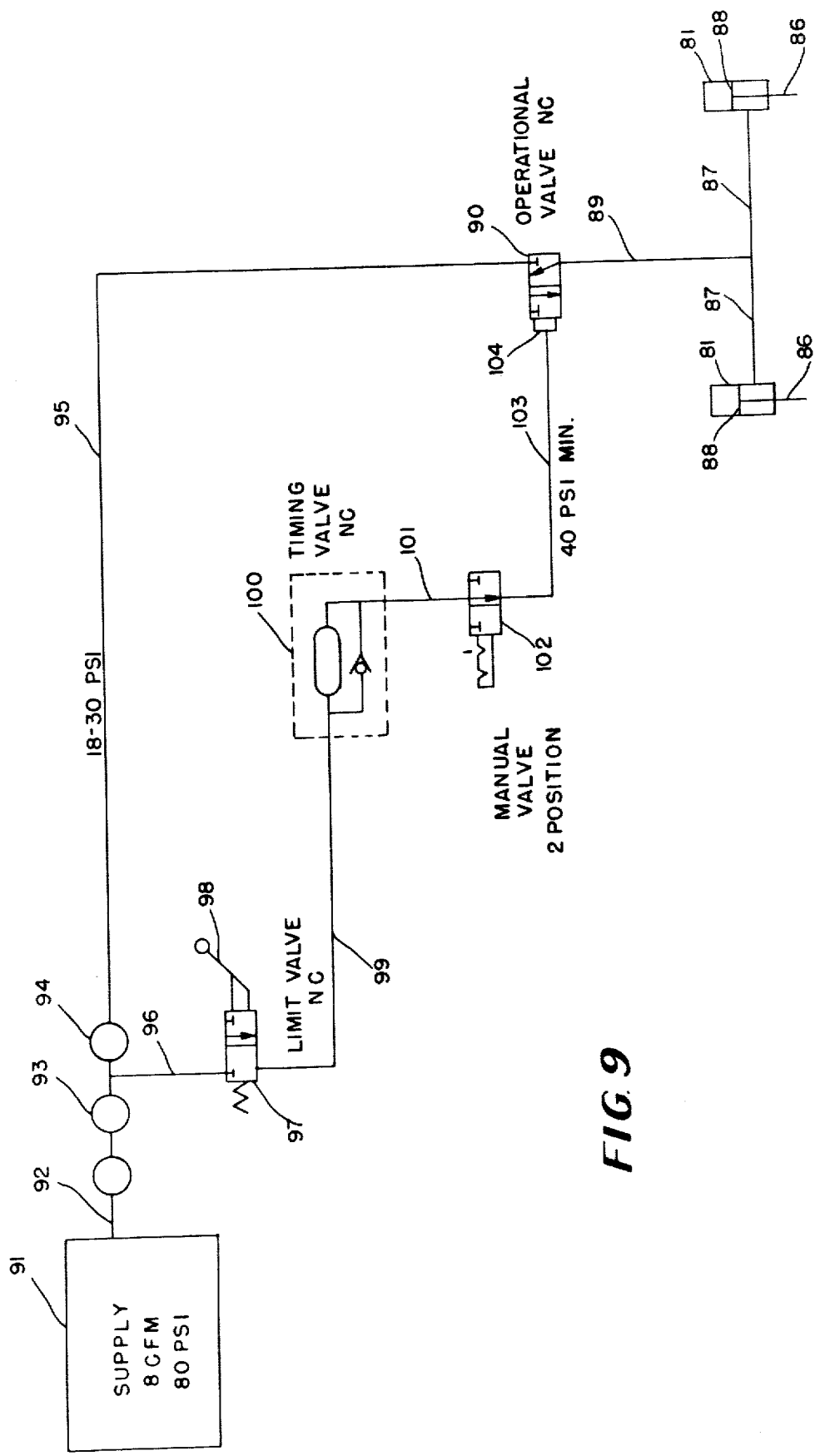

WORKPIECE SUPPORT AND DISCHARGE SYSTEM FOR POWER SQUARING SHEARS

BACKGROUND OF THE INVENTION

1. Field of the Invention

This invention relates to an improved workpiece support table for supporting the end portion of a workpiece extending rearwardly beyond the cutting blades of a power shear during the shearing operation and for discharging the sheared blank. More particularly the invention relates to a support table having a table top which is movably mounted to reciprocate vertically relative to a stationary frame during the shearing operation followed by a rearward tilting of the table top to discharge the sheared piece.

2. Background of the Invention

The following patents representative of the prior art relating to work supports for shears are known:

U.S. Pat. No. 1,150,541
U.S. Pat. No. 1,852,534
U.S. Pat. No. 2,549,560
U.S. Pat. No. 2,793,693
U.S. Pat. No. 2,933,966
U.S. Pat. No. 3,260,145
U.S. Pat. No. 3,631,750
U.S. Pat. No. 3,670,611
U.S. Pat. No. 3,760,668
U.S. Pat. No. 3,841,183
U.S. Pat. No. 3,842,699
U.S. Pat. No. 3,861,258
U.S. Pat. No. 3,903,770
U.S. Pat. No. 4,014,230

Although work support tables for shears which yieldably support the overhanging end of a workpiece while the workpiece is sheared, and which discharge the sheared workpiece from the table by tilting the table are broadly old in the art, none are known to applicant which have the unique features of the present invention as disclosed and claimed herein.

SUMMARY OF THE INVENTION

It is an object of this invention to provide a work support table which attaches to the backside of a power shear to provide assistance in supporting metal blanks in power shear operations. The invention is particularly designed for use with a squaring shear, however, it is not intended that its use be limited to one particular type of shear. Once the shearing operation has been completed, the apparatus will provide an orderly discharge of the piece part for accumulation.

It is another object of this invention to provide a work support table which includes a frame, and a separate table top. The frame has horizontally spaced side frame members between which the table top is mounted for vertical displacement and tilting. The front portion of the table is supported for limited vertical displacement by rollers rotatably mounted on opposite sides of the table and engaged in horizontal track sections of vertically displaceable tracks interposed between the table top and the frame. The tracks have vertical track sections which are guided in vertical displacement by vertically aligned rollers rotatably mounted on the sides of the frame. The rear portion of the table top is supported separately from the front portion by rear table supports on opposite sides of the table top. The rear table supports are guided for vertical displacement in vertical ways provided on opposite sides of the frame.

The table top is displaceable downwardly in substantially a horizontal level position during initial movement thereof in response to operation of the shear in shearing a workpiece. The initial downward displacement is caused by push rods rigidly connected to the movable shear blade support by bracket means. The push rods extend in vertical alignment with the displaceable tracks on opposte sides of the table top and in contact therewith to depress the tracks as the movable shear blade descends. The table top is tiltable rearwardly after its initial downward displacement in substantially horizontal level position by continued downward movement of the rear table supports after the front table rollers and track have reached their lower limit of travel.

It is a further object of the invention to provide a workpiece support and discharge table which will permit separation of trim cuts and scrap from the work product and provide separate discharge thereof.

Trim cuts are made to remove irregular material for establishing a straight edge and for establishing an edge at right angle or any angle to an existing edge. Any material being sheared from a sheet that is not the finished blank may be called trim cuts or scrap.

Trim cuts may be any shape or size. Small parts and trims may fall in varied directions due to cutoff release and bouncing on other shear members or the floor. Removing would require individual handling or equipment such as shovel, scoop, etc.

Narrow trim cuts will have a lot of twist. Some may even take the appearance of a corkscrew. These cuts sometimes become entangled in the underdrive of the shear. Narrow trim usually requires individual handling. Existing conveyor, transfer, and supporting equipment are subjected to small and narrow trims, interfering with drives, chains, belts, levers, linkage, etc. Trim cuts of strip shape may be removed individually or with equipment such as a fork lift.

Gaged parts to be used, being the drop, also fall in the same direction as the trim cuts. Small cuts, narrow trim cuts, strip cuts and gaged parts will accumulate in the same pile if allowed.

Removal of sheared material requires going beneath the rear of the shear and its rear gaging system.

Material that has passed through the blades is supported by its own rigidity; this being that the overhung material will droop or bend by its weight versus its rigidity. The drooping will cause inaccuracy in gaging according to the amount of droop. With the drooping or overhung load the cutting edge of the lower blade becomes a support point.

While positioning material the lower cutting edge will scrape the material, causing surface marks to the underneath surface. Sometimes the blade edge will drag into the material, requiring the drooping edge to be lifted until gaged position is acquired.

Surface irregularities and grit accumulating on material and blade edge can be very abrasive to blade edge when drooping material is dragged over the cutting edge. Where a burr free cut is required, blade life would be reduced by the drooping material condition.

The uncontrolled fall of a sheared blank often causes nicks, scratches and bent edges when hitting parts of the shear, the floor, or other sheared material.

Rails with a series of rollers provide support for material extended past the shear blade. The distance of the first roller from cut line determines the size part to be transferred as a sheared blank. As the supports pivot to an inclined position, the distance between the first roller and the cut line increases. This allows trim and scrap cuts to fall freely between front roller and blade although the trim may be distorted or curled. The fall is directed down the ramp plate to the rear of support frame. Being at the rear permits easy removal. Also, containers may be used to catch trims and small cuts. Sheared material is removed without disconnecting equipment or disrupting present operation.

Material to be sheared is supported by the rollers after passing the blades or cut line. This allows easy positioning of material without friction against lower blade edge. Also, the material is supported horizontally and straight for correct contact with the back gage. Any material that can bridge the distance to the first rolls may be supported. This should include all metals except some thin foils. Also most plastic, fiber and synthetic materials can be supported.

Supporting may be done through the shearing part of the stroke; this being that the support table is synchronized with the upper knife or cutting blade. Synchronization may be discontinued after initial movement of upper knife. This would allow dropping supports early to reduce cycle time of supports.

At a predetermined distance below the lower limit of the upper knife, the vertical movement of the L-channel is stopped. At this point the forward pivot of the support table is allowed to move horizontally only. As the rear pivot reaches its lower limit, the support table with rollers on the rails is in an incline toward the rear. This allows the supported sheared blank to be discharged from the rear of the support rail.

During basic shearing operation there are no controls for the operator to be concerned with. The signal is received directly from movement of the upper knife member. An adjustable timing control allows material to be discharged from supports before returning to upper support position. A manual control permits support or incline position for maintenance or setup.

By removing two drop-in pins and lowering casters, the entire unit may be moved away from the shear.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 9 is a schematic diagram of the pneumatic circuit for operating the pneumatic lift cylinders for the work support table of this invention.

DETAILED DESCRIPTION OF THE PREFERRED EMBODIMENT

Figure 1:
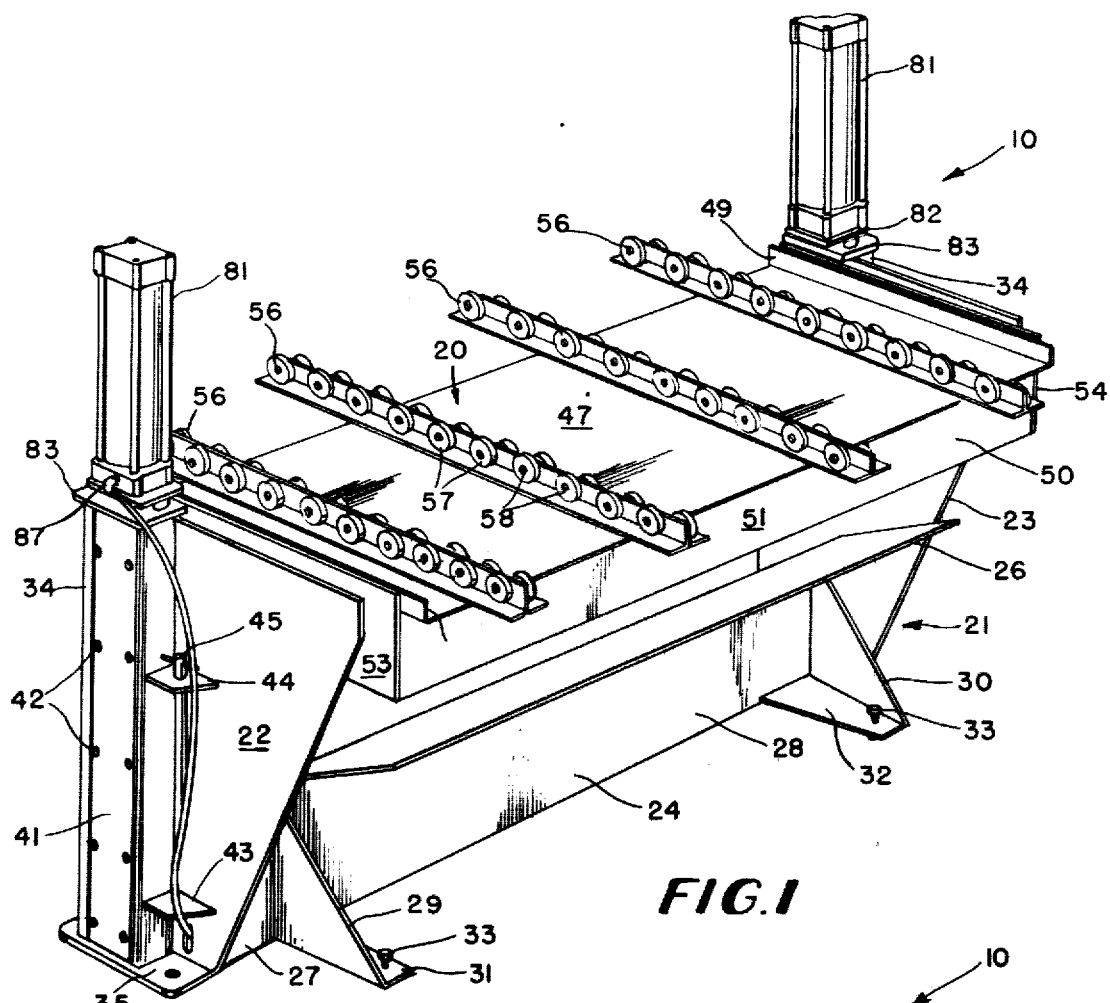
FIG. 1 is a perspective view taken from the front of the workpiece support table of this invention.

Referring now to the drawings, the workpiece support table of this invention is generally designated by the reference numeral 10. The table 10, as seen in perspective in FIG. 1, is a free standing portable unit which is adapted to be moved into position adjacent to the backside of a power shear 11 as seen in FIG. 3 and to be secured to the frame of the shear by a pair of pin and bracket connectors 12 (only one shown) which are located on opposite sides of the table 10.

Figures 3, 4:
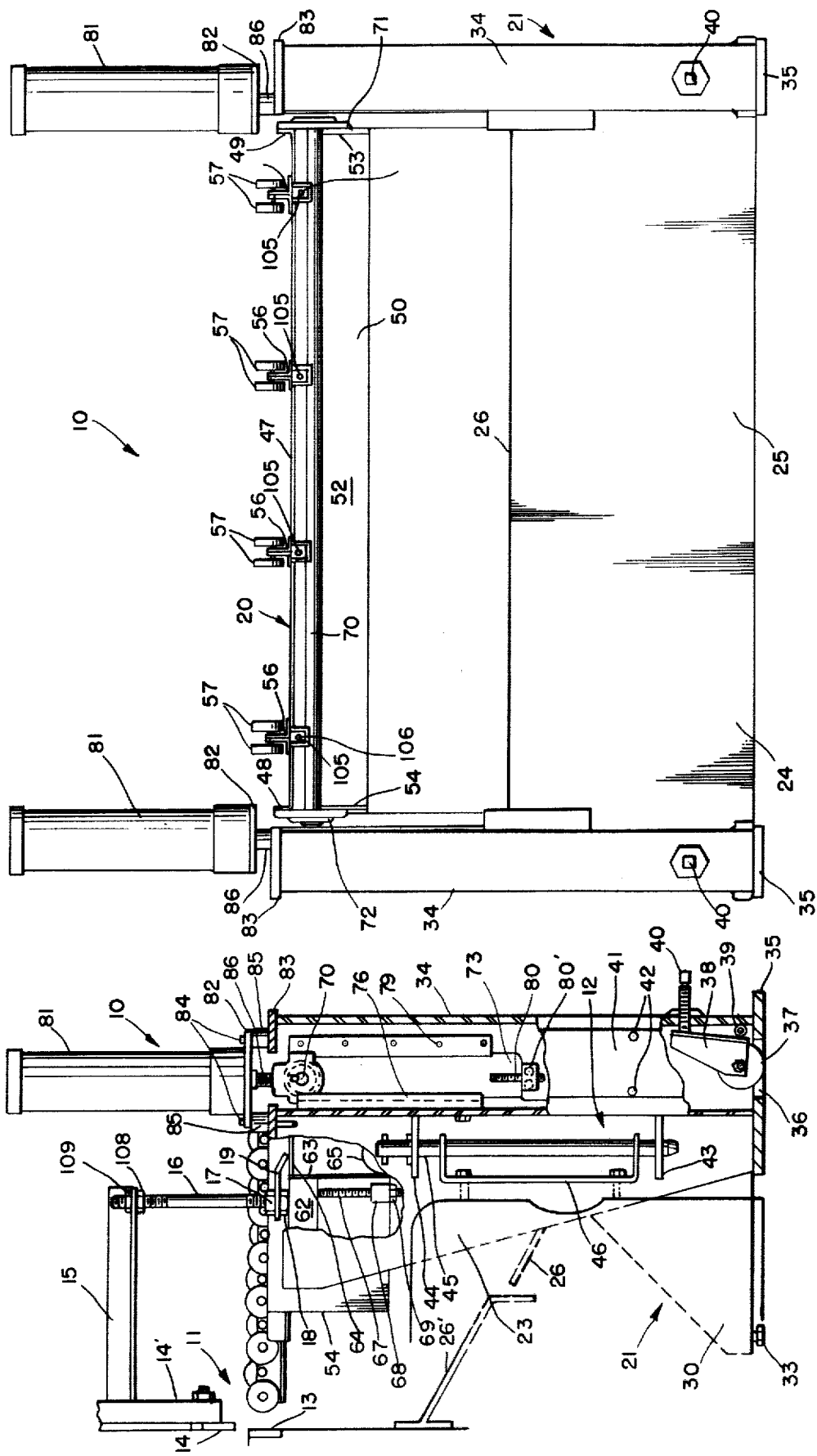
FIG. 3 is a side elevational view of the invention with parts broken away and in section.
FIG. 4 is a rear elevational view of the invention.

The shear 11 as shown fragmentally in FIG. 3 includes a fixed blade 13 and a movable blade 14 which is supported for reciprocation in a vertical plane by a ram (not shown). A pair of horizontal bracket arms 15 (only one shown) are rigidly connected at opposite ends of the movable blade support 14' on the backside thereof and are extended rearwardly therefrom. A vertically disposed push rod 16 is adjustably secured in depending relationship to the outer end of each of the bracket arms 15. A pair of nuts 17,18 threaded on the lower end of each push rod 16 support a pneumatic valve actuator bar 19 between them. The lower nut 18 serves as contact means for engaging and depressing a vertically movable bracket, subsequently to be described, which supports the front portion of the table top 20.

The workpiece support table 10 comprises a vertically displaceable and tiltable table top 20 mounted on a frame, generally designated 21. The frame 21 includes a pair of parallel, vertically upright side plate members 22,23 which are horizontally spaced sufficiently to permit free movement of the table top 20 between them. The side members 22,23 are rigidly connected to intermediate lower frame structure 24 which spans the space between the side plate members. The intermediate lower frame structure includes a vertical plate 25 which is welded at its opposite ends to the side plates 22 and 23 and an inclined plate 26 which is joined at its lower edge to the top of the vertical plate 25 and is inclined upwardly and forwardly therefrom. The ends of the inclined plate 26 are welded to the side plates 22 and 23. A bottom horizontal plate 27 is welded at its opposite ends to the inside planar surfaces of the side plates 22 and 23 adjacent their bottom edges. A second vertical plate 28, welded to the underside of the inclined plate 26, depends therefrom forward of and parallel to the vertical plate 25. It is joined at its bottom edge to the forward edge of the horizontal plate 27. The two vertical plates 25 and 28, the bottom horizontal plate 27 and the inclined plate 26, make up the rigid box-like lower frame structure 24 interconnecting the side plates 22 and 23. Vertically disposed, horizontally spaced triangular brackets 29 and 30 extend forwardly from the front side of the vertical plate 28 toward the shear 11. Horizontal gusset plates 31, 32 connect the bottom edges of the triangular plates 29 and 30 respectively with the front of the vertical plate 28. A leveling screw 33 extends through each of the gusset plates 31,32 to provide means for leveling the table 10. A hollow vertical column 34 is mounted on the outside of each of the vertical side plates 22 and 23 adjacent the rear edge portion thereof. Horizontal foot plates extend outwardly from the bottom edge of each of the vertical side plates across the bottom of the hollow columns. The foot plates 35 are each provided with an aperture 36 at the bottom of column 34 through which a vertically adjustable, pivotally mounted caster within the column 34 extends. The casters 37 are each rotatably mounted on a bracket 38 which pivots about a horizontal pivot 39 supported adjacent the bottom of the column 34. The bracket 38 extends upwardly from the pivot 39 and engages an adjusting screw 40 threaded through the backside of the column 34. By turning the screw 40 in the caster 37 may be extended through the aperture 36, and by turning the screw 40 out the caster may be raised relative to the foot plate 35 under the weight of the table until the foot plates 35 rest on the underlying supporting surface.

Each of the columns 34 is provided with an outer removable cover plate 41 in order to provide access with the interior of the column. The cover plate 41 is secured to the column 34 by screws 42.

Vertically spaced horizontal brackets 43, 44 extend forward of each of the hollow columns 34 toward the shear 11 (see FIG. 3). The brackets 43 and 44 have aligned holes for receiving a drop pin 45 by which the table 10 is attached to a vertically mounted C-shaped bracket attached to the rear side of the shear frame. The brackets 43 and 44 attached to the table frame 21 and the drop pin 45 make up the bracket and pin connecting means 12 on each side of the table 10 by which the table 10 is removably attached to the shear by inserting the drop pin 45 through aligned holes in the brackets 43, 44 and 46.

Figure 2:
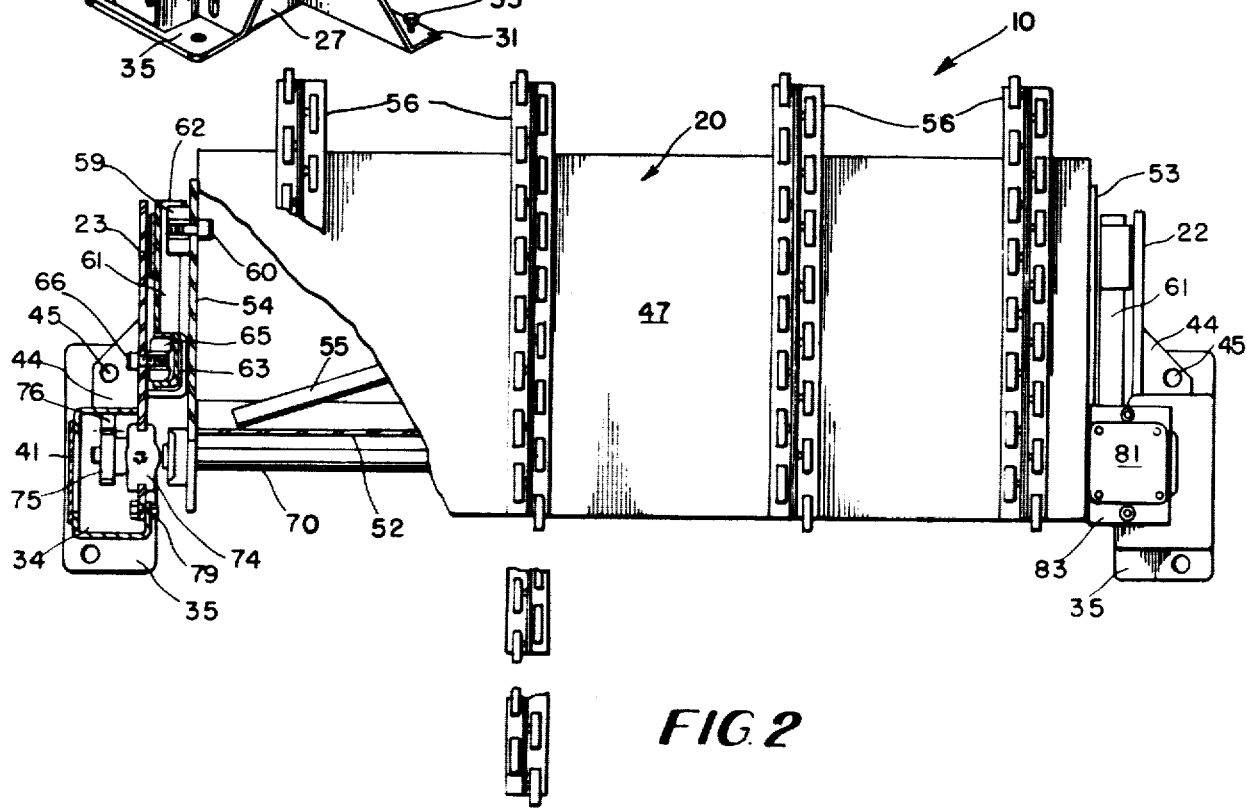
FIG. 2 is a top plan view of the invention with parts broken away and in section.

As seen most clearly in FIGS. 1 and 2, the table top 20 includes a horizontally disposed rectangular plate 47 having upturned flanges 48, 49 at opposite side edges. The plate 47 is supported on a rectangular box-frame 50 comprising parallel front and rear plate members 51, 52 and parallel opposite side plate members 53, 54. The frame members 51 through 54 are vertically oriented with the side plate members 53, 54 extending above the tops of the front and rear plates 51 and 52 so that their upper edges are level with the top edges of the side flanges 48, 49 of the table top plate 47. Interior bracing 55 is provided inside of the box-like rectangular frame 50 as seen in FIG. 2 where a portion of the top plate 47 is broken away to expose the interior of the frame 50 to view.

Four horizontally spaced, inverted T-shaped roller rails are mounted in parallel across the table top 20. They are each removably secured to the topside of the horizontal plate 47 with the arm of the T positioned down and with the leg of the T extended up. A plurality of rollers 57 are rotatably mounted in staggered relationship on opposite sides of the vertical leg of each of the inverted T-shaped rails 56 by pivot pins 58 extending horizontally through the vertical leg of the rail. The rollers 57 provide antifriction support for moving a workpiece across the top of the table 10. Normally the table top 20 is positioned with the tops of the rollers 57 approximately level with the top of the fixed blade 13 of the shear so that workpieces which are to be cut by the shear may be extended past the fixed cutter blade 13 and supported by the rollers 57 without dragging against the cutting edge of the fixed blade. As seen in FIG. 1, the roller rails 56 extend forwardly and rearwardly of the top plate 47. When the table 10 is connected to the shear as previously described and illustrated in FIG. 3, the fronts of the rails 56 are spaced from the stationary cutter blade 13 by a distance to permit narrow trim pieces cut from the workpiece in a squaring operation to drop between the cutter blade 13 and the rails 56.

Figure 5:
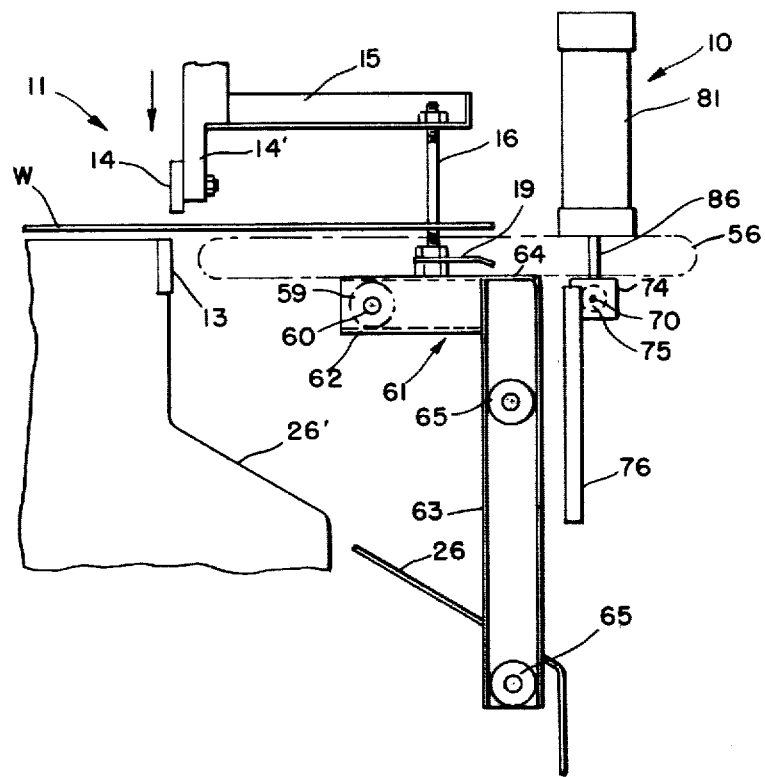
FIG. 5 is a functional diagrammatic view of the workpiece support table in its normal horizontal position for supporting the overhanging end of a workpiece blank relative to the stationary blade of a power shear.
Figure 6:
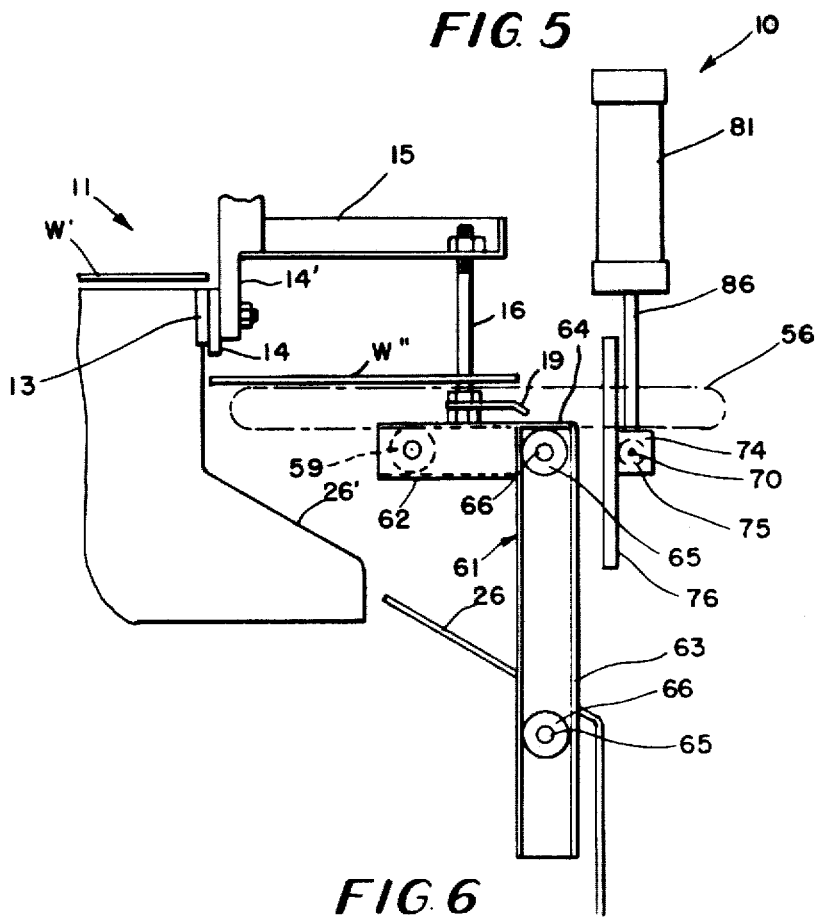
FIG. 6 is a functional diagrammatic view of the workpiece support table still in a horizontal position, but depressed in response to the downward movement of the movable shear blade.
Figure 7:
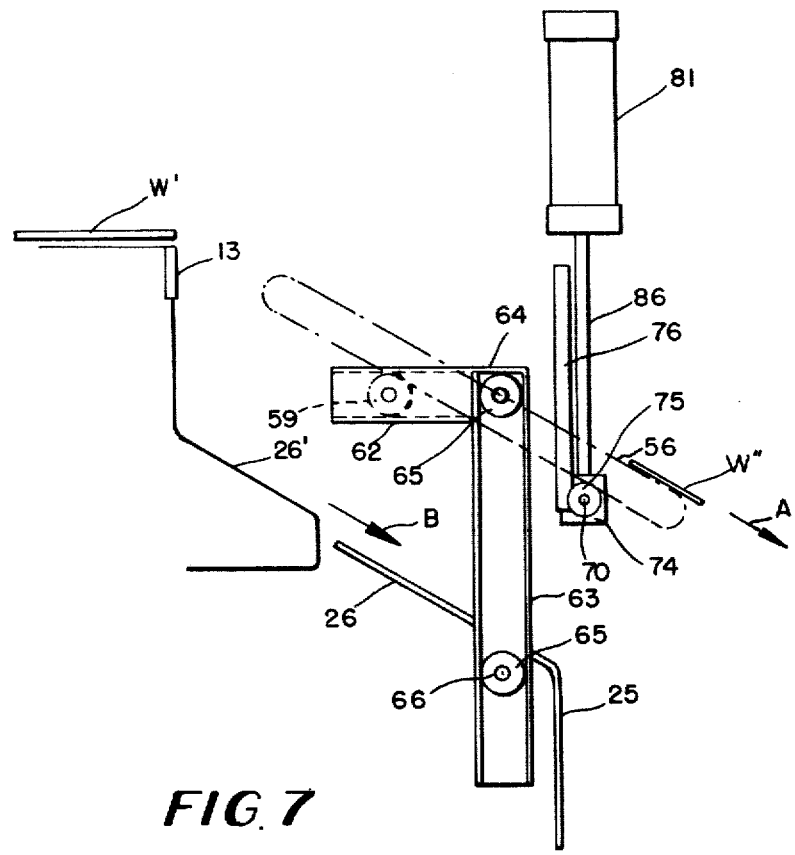
FIG. 7 is a functional diagrammatic view of the workpiece support table, still in the depressed position at FIG. 6, but with the table top tilted rearwardly to discharge a workpiece.
Figure 8:
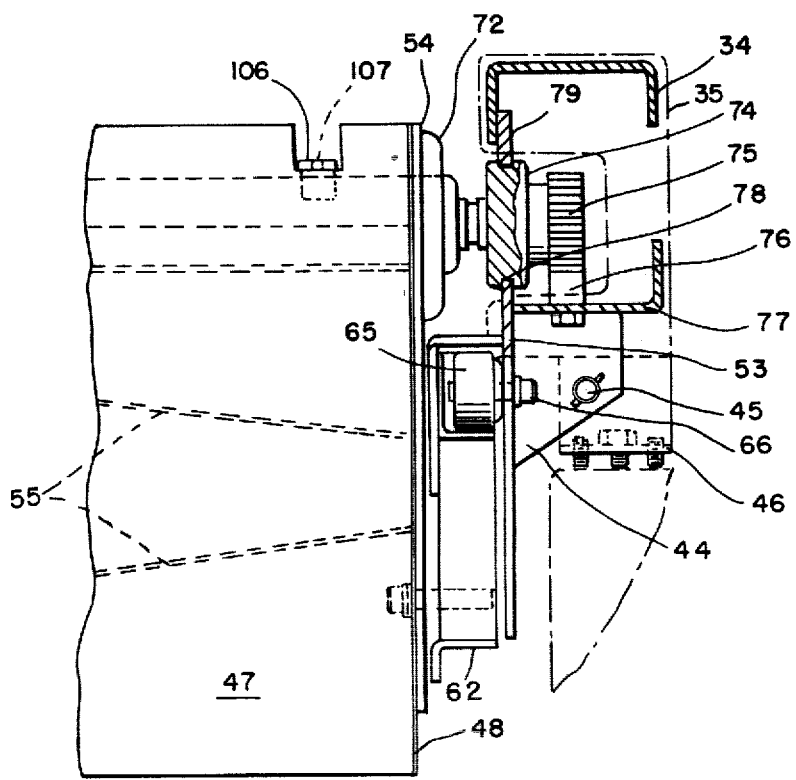
FIG. 8 is an enlarged fragmentary top plan view of a portion of the workpiece support table and one side of the frame showing parts of the table support in section.

Important to the present invention is the means for mounting the table top 20 for vertical reciprocation and tilting relative to the table frame 21. The mounting mechanism is seen most clearly in FIGS. 2, 3 and 8. FIGS. 5, 6 and 7 diagrammatically illustrate the operating sequence of moving the table top down, as the workpiece is sheared, from a predetermined normal position level with the top of the stationary cutter blade, as seen in FIG. 5, to a predetermined lowered position as seen in FIG. 6, and then tilting the table top rearwardly to discharge the sheared blank onto a stack or receiver as seen in FIG. 7.

The means for mounting the table top 20 for vertical reciprocation and tilting movement relative to the frame 21 includes separate supports for the front portion of the table top and for the rear portion of the table top.

As seen in FIG. 2 on the left hand side where the top plate is broken away and parts are shown in section, a roller 59 is rotatably mounted outside of the side plate 54 of the table top frame 50 on a journal pin 60 which extends through the side plate 54. The roller 59 and journal pin 60 are located closer to the forward portion of the table top frame 50 than to the rear portion thereof. Although not shown, another roller 59 is supported on a journal pin 60 outside of the side plate 53 on the opposite side of the table from the roller 59 shown. It will be understood that the means for supporting the right side of the table top is similar to the means for supporting the left side of the table top shown in FIG. 2.

Interposed between the side frame members 23 and 24 on each side of the table 10 and the side plates 53 and 54 of the table top frame 50 are vertically displaceable inverted L-shaped channel brackets 61. Each of the channel brackets 61 has an upper horizontal channel leg 62 opening inwardly toward the table top 20, and a depending vertical channel leg 63 opening outwardly toward one of the frame side members 22 or 23. The vertical channel leg 63 opens outwardly for its entire length to the top edge of the horizontal channel leg 62 where an end closure plate 64 is fastened.

The vertical channel leg 63 is guided for vertical reciprocation by a pair of vertically spaced and vertically aligned rollers 65, 65 which are rotatably mounted on the inner planar face of one of the frame side plates 22 and 23 by journal pins 66 which extend through the side plates.

It will be apparent that the horizontal channel leg 62 serves as a horizontally disposed roller receiving tract section for the table top mounted roller 59, and that the vertical channel leg 63 serves as a vertically disposed roller receiving track section for the pair of rollers 65, 65 mounted on the inside of one of the side frame members 22 and 23. Downward movement of the vertically displaceable bracket 61 is limited by the engagement of the top roller 65 with the end plate 64 as seen in FIG. 6. The table top roller 59 is free to move horizontally in the track section 62, and the table may tilt about the axis of the journal pin 60 supporting the roller 59 on the side of the table top.

The rear portion of the table top 20 carries a horizontally disposed shaft 70 extending along the back plate 52 and projecting on opposite sides of the table top 20 through bearings 71 and 72 carried by the opposite side plates 53 and 54 of the table top underlying frame 50. Each of the opposite ends of the shaft 70 extend into one of the opposite hollow columns through a vertical guide slot 73 (see FIG. 3) in the inner wall of the column. A guide bearing 74 is carried on each end of the shaft 70 where it passes through the slot 73, and a gear 75 is keyed to each end of the shaft outwardly of the bearing 74. The gear 75 engages a rack 76 mounted vertically on the inside of the column 34 along the forward wall 77 thereof. The forward edge 78 of the slot 73 is the vertical rear edge of the side plate 22 or 23 to which the column 34 is attached. The rear edge of the slot 73 is the forward edge of a gib 79 removably mounted vertically inside of the column 34. The guide bearing 74 mounted on each end of the shaft 70 has vertically oriented grooves on each side thereof which engage the edges of the slot 73 and slide relative thereto. A lower limit set screw 80 is mounted vertically at the bottom of the vertical slot 73 to limit the downward movement of the guide bearing 74 and thus to limit the downward movement of the rear portion of the table top 20.

Mounted on top of each of the hollow columns is a vertically oriented pneumatic cylinder 81. A foot plate 82 at the base of the cylinder 81 is secured to the top plate 83 of the column 34 by cap screws 84. Elastomeric spacers 85 separate the foot plate or cylinder bottom flange 82 from the top plate 83 and serve as cushion elements. A piston rod 86 extends downwardly from the bottom of the cylinder 81 and connects to the top of the bearing guide 74. Vertical movement of the bearing guides 74 on opposite sides of the table top 20 is equalized because of the rack and pinion connections on opposite ends of the shaft 70 which is rotatably mounted to the back of the table top.

Looking now at the schematic pneumatic circuit diagram in FIG. 9, the pneumatic cylinders 81 are shown as single acting cylinders each having a fluid line 87 connected to the bottom of the cylinder below the piston 88. In the pneumatic system disclosed, the pistons 88,88 in the opposite cylinders 81,81 are lifted by air supplied from a pressurized air supply 91 through a regulator 94, main line 95, main operation valve 90, main valve output line 89 and branched feeder lines 87,87. The main operation valve 90 is a normally closed, two-position pilot operated valve which is supplied with pilot fluid of about 40 psi minimum through a pilot line 96 branching off from the main air supply line 92 before the regulator 94. The pilot line 96 includes a normally closed spring biased two-position limit valve 97, a normally closed timing valve 100 connected downstream of the limit valve 97 by conduit 99, a two-position manual valve 102 connected downstream of the timing valve 100 by conduit 101, and a fluid motor actuator 104 for opening the main valve 90 connected downstream of the manual valve 102 by conduit 103. The pilot line 96 normally functions as a holding circuit to keep the pistons 88,88 lifted when the shear 11 is in its non-operating raised position.

When the limit valve 97 is actuated to its open position, fluid is applied through the pilot line 96, the open limit valve, conduit 99, timing valve 100, conduit 101, the normally open manual valve 102 (in the position shown), and conduit 103 to the fluid main valve actuator 104 which switches the main valve 90 open. When the main valve 90 opens, regulated air (of from 18–30 psi) from the pressure regulator 94 is fed through conduit 95, the open main valve 90 conduit 89 and branch lines 87,87 to the bottom of the cylinders 81,81. The pistons 88 are thereupon forced up lifting the piston rods 86,86, guide bearings 74,74, torque shaft 70 and consequently the table 20.

The limit valve 97 is mounted on the support frame 21 of the table 10 where its valve arm 98 will be contacted by the bar-valve-release 17, which is connected to the push rod 16 attached to the shear 11 by bracket 15 as shown in FIG. 3, in the up position of the shear ram. When the limit valve arm 98 is contacted by the bar-valve-release 17, the limit valve 97 is opened, (i.e., it is moved to the left from the position shown), and air is supplied to the main valve actuator 104, to open the main valve 90 and lift the pistons 88, 88. Once lifted, the pistons 88,88 are held up by air supplied through the open main valve until the shear ram is actuated downwardly to depress the push rod 16 and to disengage the bar-valve-release 19 from the limit valve arm 98. Once the limit valve arm 98 is disengaged from contact with the bar-valve-release 19, the limit valve is biased to its normally closed position as shown in FIG. 9 thereby switching the conduit 99 from air supply line 96 to exhaust. Pressure in the fluid actuator 104 is released through line 103, valve 102, conduit 101, valve 100 and conduit 99 through the limit valve 97 to atmosphere. The main valve 90 moves to its normally closed position, thus exhausting air from the cylinders 81, 81 and allowing the table top 20 to move first vertically downward as the push rods 16 depress the channel brackets 61 on opposite sides of the table 20 to the position shown in FIG. 6. The back of the table 20 will continue to descend under the force of its own weight and of the weight of the sheared product W''' thereby tilting the table top down rearwardly in the manner shown in FIG. 7. As the rear of the table top 20 continues to move downwardly after the descent of the channel brackets 63 on opposite sides of the table is stopped by engagement of the upper roller 65 with the channel closure plate 64, the table top mounted roller 59 is free to move in the channel section 62 and will move rearwardly a limited distance. The downward movement of the rear of the table top is stopped when the guide bearings 74 on opposite sides of the table 10 engage the top of the lower limit set screws 80. The position of the set screws 80 can be adjusted in their mounting clamps 80'. With the table top 20 tilted as shown in FIG. 7, the work product W''' which has been sheared from the now shortened work blank W' will roll off the table top on the roller rails 56 in the direction of the arrow A.

Once the moving blade 14 of the shear 11 has made its cut and reached its lower limit of travel, it will return to its normal raised position carrying with it the bracket 15, push rod 16 and bar-valve-release 19. As the bar-valve-release 19 approaches its upper position as shown in FIGS. 3 and 5, it engages the limit valve actuator arm 98 and opens the limit valve 97 to pressurize the conduit 99 with air from conduit 96, at about 40 p.s.i. minimum. The admittance of high pressure air from conduit 99, into conduit 101, open manual valve 102, conduit 103 and main valve actuator 104 is delayed by the timing valve 100 which provides sufficient delay for the discharge of the sheared product blank W'''. After a predetermined delay, high pressure air passes through the delay valve 100 and reaches the main valve actuator, opening the main valve. The pneumatic cylinders 81,81 are then energized to lift the pistons 88,88 and thus to lift the table top 20 up to the position shown in FIG. 5. The table 10 is then ready to receive the overhanging end of a new workpiece extended through the shear and to begin a new cycle.

The air supply should preferably be at 80 p.s.i. at 8 c.f.m. for maintaining a uniform cycle pattern. Eighty p.s.i. should be maintained on the circuit feeding the main valve pilot 104 and at no time should the pressure in line 96 drop below 40 p.s.i.

Air pressure for the cylinders 81,81 should be regulated at 18 to 30 p.s.i. Ideal pressure is the minimum pressure required to lift the table top 20. Extreme high pressure can cause excess wear and possible equipment damage.

The manual valve 97 allows the table top 20 to be lowered for maintenance.

Cylinder cushion on the rod end should be set at maximum cushion at all times. Return cushions should be adjusted for smooth stop.

The work support roller rails 56 are removably held in position on the table top plate 47 by spring pressed plungers 105 extending longitudinally beneath the rails. The plungers 105 each engage in an aperture 107 provided in a depending lug 106 struck out of the edge of the top plate 47 and bent downwardly at a right angle to the plate. There are four equally spaced lugs 106 provided along the rear edge at the table top 20 as seen in FIG. 4. The spring tension on each plunger 105 is adjusted so the rails 56 may be latched in or released with moderate pressure. Different length sets of roller rails 56 may be easily substituted one for the other depending upon the length of the blank to be cut from the workpiece.

In setting up the table 10 for use, the table is rolled into position behind the shear 11 on its casters 37. The vertically aligned apertures in the brackets 43,44 on the table frame 21 are moved into alignment with the apertures in the brackets 46 attached to the rear of the shear 11 and a drop pin 45 is dropped into the aligned apertures to lock the table and shear together. The table frame 21 is then lowered until the foot plates 35 at the base of columns 34 on each side of the frame rest on the floor by raising the casters 37. The frame 21 is leveled by adjusting the forward leg leveling screws 33 in each of the forward legs 29,30.

The desired normal height of the table top 20 is attained by raising or lowering the cylinder mounting plates 82 using spacers 85 of selected size to achieve the desired spacing of the mounting plates 82 from the top plates 83 on the column 34. The mounting cap screws 84 should be adjusted uniformly so that the guide bearing 74 slides freely within its ways. The forward height of the table 10 is attained by adjusting the stud 67 in table lug 68 against the base of the horizontal channel section 62. The stud is locked in adjusted position by lock nut 69.

The length of the push rod 16 depending from the shear ram carried bracket 15 is adjusted by turning the adjustment nuts 108 and 109 on the threaded upper end 110 of the push rod until the desired adjustment is made. This adjustment is made with the table top 20 and the shear ram in top position.

The bar-valve release 19 is set for approximately one-eighth inch travel before the limit valve actuator 98 is released.

The take-up gibs 79 are adjusted for approximately one-sixty-fourth inch sliding clearance between the guide bearing 74 and its ways. The rack 76 in each column 34 is located relative to the gear 75 on the torque shaft 70 with the cylinders 81,81 in up position after the table 10 has been leveled. The backlash between the rack 76 and the gear 75 should be approximately 0.020 inches. This can be achieved by adding shims between rack 76 and the front wall 77 (FIG. 8) of the column 34.

The lower limit adjustment studs 80 for limiting downward movement of the bearing guides 74 are adjusted by loosening clamping block 80. These studs provide stops for the table 20 in dump position.

The inclined plate 26 of the table 10 cooperates with the inclined plate 26' attached to the rear of shear 11 to provide a chute for trim pieces and scraps which fall between the stationary shear blade 13 and the front rollers 57 of the roller rails 56. The chute directs the trim pieces and scrap centrally beneath the table top 20 into an accessible area where it may be accumulated either on the floor or in a receiver.

It is within the scope of this invention that other power means for lifting the rear end portion of the table top other than the lift means described and illustrated herein may be substituted.

While in the foregoing there has been described and shown a preferred embodiment of the invention, various modifications and equivalents may be resorted to within the spirit and scope of the invention as claimed.

What is claimed is:

1. A vertically displaceable and tiltable workpiece support table for power shears, said shears having a stationary blade and a movable blade movable relative to the stationary blade to provide a shearing action along the shearing edges of said blades, said stationary blade having a shearing edge which is normally horizontally disposed at a predetermined level, comprising a displaceable table top, a frame for supporting said displaceable table top on the back side of the power shears with the table disposed rearwardly of the stationary blade and normally in a level position at substantially the same level as the shearing edge of said stationary blade, said frame including a pair of horizontally spaced upright side members each having an inner vertically disposed planar surface which is parallel to and faces the planar surface of the other upright member, a pair of vertically displaceable brackets, one of said brackets being supported on each of said planar surfaces, each of said brackets having a horizontally disposed roller receiving track section, and a vertically disposed roller receiving track section, first roller means rotatably mounted adjacent the inner planar surface of each of said side members and disposed in the vertically disposed roller receiving track section of one of said vertically displaceable brackets for guiding said bracket in vertical displacement between predetermined upper and lower limits, said table top having a top work support surface, a front, a back, and parallel opposite sides connecting said front and back, second roller means rotatably mounted on each of the opposite sides of said table top, said second roller means being spaced at equal distances from the front of said table and closer to the front than to the back, said second roller means on each side of said table top being received in the horizontally disposed roller receiving track section of one of the vertically displaceable brackets and movably guided therein, vertical guide ways on each side of said frame rearwardly of said vertically displaceable brackets, rear table support means journalled on each side of said table adjacent said back, the rear table support means on each side of said table being engaged in an adjacent one of said vertical guide ways for vertical reciprocation between upper and lower limits, the lower limit of movement of said rear table support means being substantially lower than the lower limit of movement of the horizontal track sections of said vertically displaceable brackets whereby the rear portion of said table top is displaceable downwardly a greater distance from the normal level position of said table top than the distance which the front portion of said table top is displaceable so that the table top tilts down rearwardly when the rear portion of said table top is displaced downwardly a greater distance than the front portion of said table top, means equalizing the vertical movement of said rear table support means in said vertical guide ways on the opposite sides of said frame, actuating rod means connectable between the movable blade of said shear and said vertically displaceable brackets for depressing said vertically displaceable brackets and consequently said table top downwardly as said movable blade descends for shearing a workpiece, and power lifting means mounted on each side of said frame and connected with said rear table support means for normally holding said table top in its normal level position, said power lifting means being automatically operable to permit descent of said table top when said movable shear descends for shearing a workpiece, and automatically operable to lift said table top when the movable shear blade ascends to a predetermined upper level after shearing a workpiece.

2. The table according to claim 1 wherein said top work support surface comprises antifriction support means.

3. The table according to claim 2 wherein said antifriction support means comprises a plurality of parallel rollers rotatably mounted on said table top.

4. The table according to claim 2 wherein said antifriction means comprises a plurality of parallel roller rails, mounted across said table top from front to rear, each of said rails having a plurality of parallel rollers rotatably mounted thereon about an axis of rotation perpendicular to the longitudinal axis of said rail.

5. The table according to claim 1 wherein said workpiece support table is a portable unit having wheel support means for transporting said unit.

6. The table according to claim 5 wherein said wheel support means includes a pair of vertically adjustable wheels, each of said wheels being supported adjacent an opposite side of said frame from the other wheel, said wheels being adjustable downwardly relative to said frame to lift said frame above an underlying support surface, and adjustable upwardly to lower said frame onto said underlying support surface.

7. The table according to claim 5 together with legs attached to said frame and leveling means mounted in said legs for leveling said table.

8. The table according to claim 5 wherein said frame has connecting means on opposite sides thereof for removably connecting said table frame to the frame of the power shear.

9. The table according to claim 1 wherein said equalizing means comprises a shaft extending horizontally between opposite sides of said table top and rotatably supported therein, said shaft having opposite ends projecting beyond said sides and extending rotatably through said rear support means on each side of said table, a gear fixed on each end of said shaft outwardly of said rear table support means, and a vertically oriented rack mounted on each side of said frame in engagement with an adjacent one of said gears.

10. The table according to claim 1 wherein there is a vertically adjustable lower limit stop mounted adjacent the bottom of each of said ways for setting the lower limit of movement of said rear table supports.

11. The table of claim 10 wherein there is a rearwardly and downwardly inclined chute mounted between the sides of said frame beneath said table top which is cooperative with a rearwardly and downwardly inclined chute mounted on the rear of a power shear for discharging small trim pieces cut by said shear rearwardly of said shear and table separately from workpieces supported and discharged by said table top.

12. The table of claim 5 wherein said table top has a front edge which is normally spaced rearwardly of the stationary blade of a power shear when said table is connected to the shear by said connecting means, the space between the stationary blade of said shear and said front edge of said table top being sufficient to permit trim pieces of a predetermined size or smaller to fall therethrough.

13. The table of claim 1 wherein said power lifting means on each side of said frame comprises a single acting fluid motor having a vertically oriented cylinder, a piston reciprocable in said cylinder, and a piston rod extending downwardly through the bottom of said cylinder, said piston rod being aligned with and connected at its lower end to one of said rear table support means, a source of pressurized fluid, main conduit means for supplying pressurized fluid from said fluid supply to each of said cylinders between the piston and bottom end of the cylinder, a main valve in said conduit means for supplying fluid to said cylinders in an open position of said main valve and for exhausting fluid from said cylinders in a closed position of said main valve, said main valve being normally biased closed and having fluid actuating means for opening said main valve, a pilot fluid conduit for supplying pressurized fluid to said main valve fluid actuator for opening said main valve, a normally closed pilot valve in said pilot fluid conduit for supplying fluid to said main valve actuator in the open position of said pilot valve and for exhausting fluid from said main valve fluid actuator in the closed position of said pilot valve, means normally biasing said pilot valve to its closed position and mechanical actuator means responsive to movement of the movable blade of a power shear for opening said pilot valve when the movable blade of said power shear is in its raised position, said pilot valve being actuated in response to downward movement of the movable shear blade to its closed position thereby exhausting pressurized fluid from said main valve actuator and allowing said main valve to close and to exhaust fluid from said cylinders, thus permitting said pistons and consequently said table top to descend.

14. The table of claim 13 wherein there is a manual supply and exhaust valve interposed between said pilot valve, said manual valve being selectively operable between exhaust and supply positions for selectively lowering or raising said table while the power shear is in its raised non-operating position.

15. The table of claim 13 wherein there is a timing valve in said pilot conduit between said pilot valve and said main valve fluid actuator for delaying the closing of said main valve and consequently delaying the lifting of said table top after the movable shear blade has returned to its raised position and thus has opened said pilot valve, said timing valve being set for a delay period sufficient to permit a workpiece to be discharged from the table top while the table top is tilted rearwardly.

16. A portable vertically displaceable and tiltable workpiece support and discharge table for separable attachment to power shears comprising a table top, a rigid frame independent of said power shears for supporting said table top including a pair of horizontally spaced upright side frame members between which said table top is supported for vertical displacement and tilting movement between a raised level position and a lowered rearwardly tilted position, said table top having a front portion for positioning adjacent the rear of a power shear, a rear portion for positioning remote from the power shear and opposite side portions, front table top support means interposed between said side frame members and the opposite side portions of said table top providing for vertical displacement of said front portion of said table top between upper and lower limits, said front table top support means also providing for horizontal and tilting movement of said front portion of said table top, rear table top support means interacting between the rear portion of said table top and said side frame members providing for rectilinear vertical displacement of the rear portion of said table top between predetermined upper and lower limits, said rear table top support means providing for continued downward displacement and tilting movement of the rear portion of said table top after the front portion of said table top has reached its lower limit, power reciprocating lift means connected to said rear table support means for lifting said table top to its raised level position from its lowered rearwardly tilted position, and control means for said power lift means responsive to the operation of a power shear for actuating said lift means to allow the descent of the table top when the movable blade of the power shear descends for shearing a workpiece and which causes said power lift means to lift the table top when the movable blade of the power shear is raised after shearing a workpiece.

17. The table for power shears as set forth in claim 16 wherein said front table top support means comprises a vertically displaceable bracket on each side of said table top, each bracket having a horizontally disposed roller receiving track section and a vertically disposed roller receiving track section, a pair of vertically aligned rollers rotatably mounted on each of said side frame members and disposed in the vertically disposed roller receiving track section of one of said vertically displaceable bracket for guiding the bracket in vertical rectilinear displacement between predetermined upper and lower limits, and a roller rotatably mounted on each side of said table top and disposed in the horizontally disposed track section of an adjacent one of said brackets wherein the roller is guided for horizontal displacement.

18. The combination comprising a power shears and a vertically displaceable and tiltable workpiece support table for said power shears, said shears having a stationary blade and a movable blade movable relative to the stationary blade to provide a shearing action along the shearing edges of said blades, said stationary blade having a shearing edge which is normally disposed at a predetermined level, said support table comprising a displaceable table top, a frame for supporting said displaceable table top on the back side of the power shears with the table disposed rearwardly of the stationary blade and normally in a level position at substantially the same level as the shearing edge of said stationary blade, means for removably connecting said table frame to said power shears, said frame including a pair of horizontally spaced upright side members each having an inner vertically disposed planar surface which is parallel to and faces the planar surface of the other upright member, a pair of vertically displaceable brackets, one of said brackets being supported on each of said planar surfaces, each of said brackets having a horizontally disposed roller receiving track section, and a vertically disposed roller receiving track section, first roller means rotatably mounted adjacent the inner planar surface of each of said side members and disposed in the vertically disposed roller receiving track section of one of said vertically displaceable brackets for guiding said bracket in vertical displacement between predetermined upper and lower limits, said table top having a top work support surface, a front, a back, and parallel opposite sides connecting said front and back, second roller means rotatably mounted on each of the opposite sides of said table top, said second roller means being spaced at equal distances from the front of said table and closer to the front than to the back, said second roller means on each side of said table top being received in the horizontally disposed roller receiving track section of one of the vertically displaceable brackets and movably guided therein, vertical guide ways on each side of said frame rearwardly of said vertically displaceable brackets, rear table support means journalled on each side of said table adjacent said back, the rear table support means on each side of said table being engaged in an adjacent one of said vertical guide ways for vertical reciprocation between upper and lower limits, the lower limit of movement of said rear table support means being substantially lower than the lower limit of movement of the horizontal track section of said vertically displaceable brackets whereby the rear portion of said table top is displaceable downwardly a greater distance from the normal level position of said table top than the distance which the front portion of said table top is displaceable so that the table top tilts down rearwardly when the rear portion of said table top is displaced downwardly a greater distance than the front portion of said table top, means equalizing the vertical movement of said rear table support means in said vertical guide ways on the opposite sides of said frame, actuating rod means connectable between the movable blade of said shear and said vertically displaceable brackets for depressing said vertically displaceable brackets and consequently said table top downwardly as said movable blade descends for shearing a workpiece, and power lifting means mounted on each side of said frame and connected with said rear table support means for normally holding said table top in its normal level position, said power lifting means being automatically operable to permit descent of said table top when said movable shear descends for shearing a workpiece, and automatically operable to lift said table top when the movable shear blade ascends to a predetermined upper level after shearing a workpiece.

* * * * *